No. 829,618. PATENTED AUG. 28, 1906.
A. J. ALLISON.
BRAKE MECHANISM FOR HAND CARS.
APPLICATION FILED FEB. 9, 1906.

2 SHEETS—SHEET 1.

WITNESSES:
P. W. Braswell,
A. L. Hough

INVENTOR
Andrew J. Allison,
BY Franklin A. Hough
Attorney

No. 829,618. PATENTED AUG. 28, 1906.
A. J. ALLISON.
BRAKE MECHANISM FOR HAND CARS.
APPLICATION FILED FEB. 9, 1906.
2 SHEETS—SHEET 2.
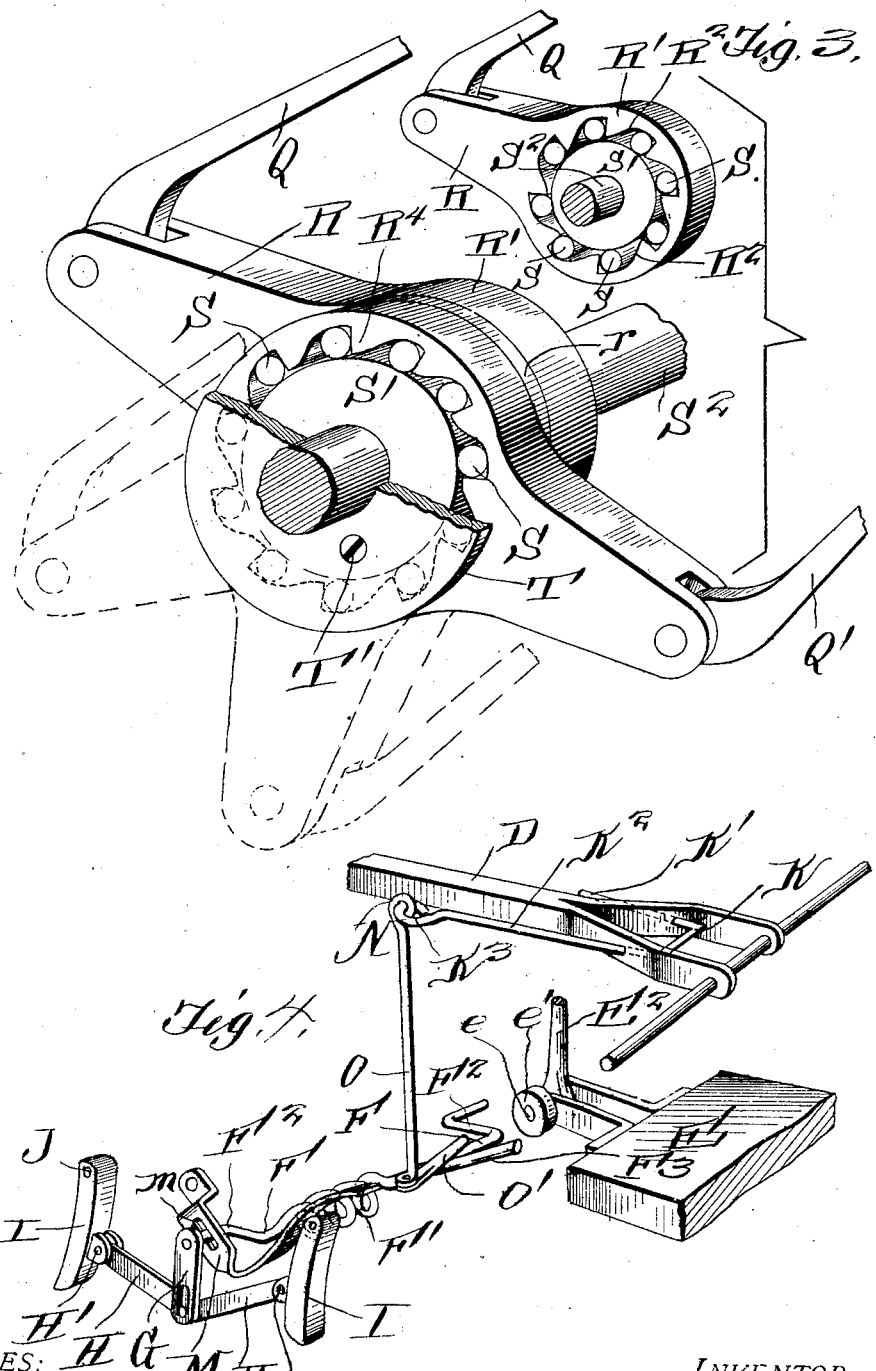
WITNESSES:
R. W. Boswell,
A. L. Hough.
INVENTOR
Andrew J. Allison,
By Franklin H. Hough
Attorney

UNITED STATES PATENT OFFICE.

ANDREW J. ALLISON, OF TYLER, TEXAS.

BRAKE MECHANISM FOR HAND-CARS.

No. 829,618.        Specification of Letters Patent.        Patented Aug. 28, 1906.

Application filed February 9, 1906. Serial No. 300,318.

*To all whom it may concern:*

Be it known that I, ANDREW J. ALLISON, a citizen of the United States, residing at Tyler, in the county of Smith and State of Texas, have invented certain new and useful Improvements in Brake Mechanism for Hand-Cars; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in brake mechanism for hand-cars; and the object of the invention is to produce a simple and efficient device of this nature which will be positive in its action and which will cause a secure and steady yielding brake and comprises various details of construction and combinations and arrangements of parts, which will be hereinafter fully described, and then specifically defined in the appended claims.

My invention is illustrated in the accompanying drawings, in which—

Figure 1:
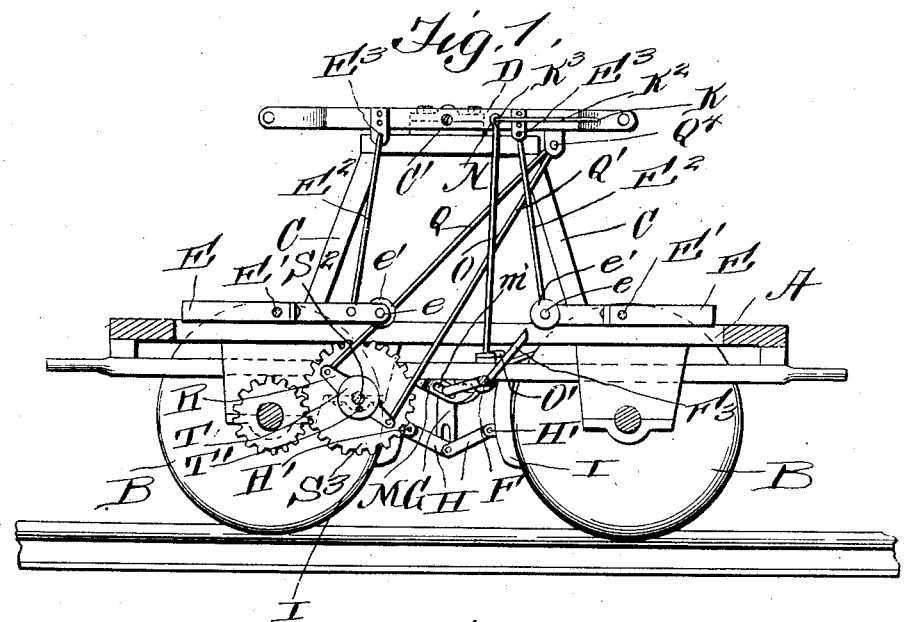
Figure 2:
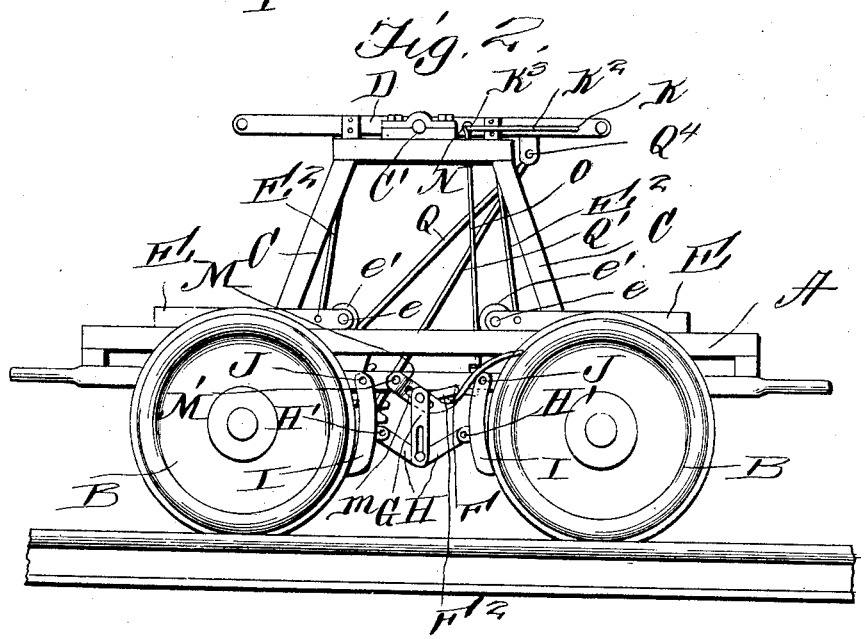

Figure 1 is a vertical sectional view through a truck showing my invention as applied thereto. Fig. 2 is a side elevation showing the brake-shoes and toggle-links for operating the same. Fig. 3 is a side elevation of a detail of the propelling mechanism, and Fig. 4 is a detail view of the mechanism for applying the brakes.

Reference now being had to the details of the drawings by letter, A designates the truck of a car having axles mounted in suitable bearings therein and on which axles the wheels B are fixed.

Rising from the platform of the truck upon a suitable standard C is a stub-shaft C', upon which the walking-beam D is pivotally mounted.

E E designate foot-treads, which are pivotally mounted upon pins E', projecting from the marginal edges of an opening in the platform. To the forward end of each tread is pivotally connected an arm $E^2$, the upper end of which arm is pivotally connected at $E^3$ to said walking-beam D at one side of its pivotal center. The pivot-pin $e$, which connects the bar $E^3$ with a projecting arm of the tread E, has journaled thereon a roller $e'$, provided for a purpose which will presently be described.

Mounted in suitable bearings upon the truck of a car, preferably underneath the same, is a shaft F, having a resilient coil F', formed out of a portion of its length, and one end is bent to form a crank-arm $F^2$, while its opposite end is bent to form a second arm $F^3$. The end of the crank-arm $F^2$ has pivotally connected thereto a link G, the lower end of which has pivotal connection with the two links H H, which in turn are pivotally connected at H' to the brake-shoes I. The upper end of each of said brake-shoes is pivotally mounted upon the pins J, projecting from the side of the truck. By this construction it will be noted that a toggle-link mechanism is afforded, whereby as the crank-shaft is thrown in one direction or the other said shoes may be thrown into contact with the circumferences of the wheels of the truck, and as soon as reverse stroke is made with hand-bars the weights of toggle-links and of foot-trippe cause brake to fall out of gear.

K designates a crank-shaft, which is journaled in suitable bearings in the forked end of the walking-beam, and said crank-shaft has a bent portion K', whereby the shaft may be gripped and pulled toward the operator, and also an elongated arm $K^2$ with an eye $K^3$ at its end adapted to engage an eye N, formed at the angled end of the crank-shaft O, having an arm O' projecting therefrom, which when the crank-shaft O is moved by the movement of the crank-shaft K is adapted to bear against the arm $F^3$ and cause the latter to be positioned in the path of the roller $e'$, whereby as the roller upon the arm of the tread descends it will come against said arm $F^3$ and cause the shaft F to rock and throw the brakes forcibly or yieldingly against the circumference of the truck-wheels.

M designates a releasing device which is pivotally mounted upon a pivot M', carried by the truck, and has an aperture $m$, through which the end of the crank $F^2$ passes, and the free end of said releasing device is adapted to bear against the crank $F^2$, so as to release the shoes from the trucks, releasing the propelling mechanism. It will be noted that the entire mechanism is completely locked if car is brought to a standstill with brake applied. This necessitated the presence of a foot-trippe to release it from its locked state. Upon leaving car standing upon grades the brake is applied, and if brought to a standstill with brake applied in either case the foot-trippe is used to release the shoes from the trucks, thereby freeing the propelling mechanism.

Pivotally connected to the walking-beam are the two arms Q and Q', and the lower end of said arm Q is pivotally connected to an arm R, projecting from a disk R'. Said disk has a central opening, the peripheral margin of which is provided with notches or grooves $R^2$, which are preferably outlined, as shown in the drawings, whereby they may be instrumental in causing the frictional rollers S to bear against the circumference of the hub S' as the disk is turned in one direction, and to turn idly when the disk is moved in the opposite direction. Said hub S' is fixed to a shaft $S^2$, which in turn carries a fixed gear-wheel $S^3$, which has geared connections with a pinion-wheel upon one of the axles. A fixed thin washer $r$ is mounted upon hub S' and is adapted to separate the two disks R' and the disk $R^4$, keeping rollers separate, which is similar in construction to disk R' and has a projection which is connected by arm Q', which in turn is pivoted at $Q^4$ to the handle-bar, as is also the arm Q upon the same pivot.

In order to take up the wear and hold the disks securely in place, I provide the ring T, one being mounted adjacent to the outer surface of each of the notched disks and held in an adjusted position by means of a set-screw T'.

In operation, as the walking-beam is tilted the arms Q and Q' will assume the position shown in dotted lines in the drawings with the disks connected, respectively, to said arms moving in opposite directions. As the arm Q' is forced downward by the walking-beam, the rollers which are held in notches will turn idly in their various notches, while the similar rollers which are mounted in the disk R' will be caused to frictionally engage the circumference of the hub S', whereby the latter may be rotated for the purpose of communicating a movement through the gear mechanism to the axle of the truck. On the upward movement of the end of the walking-beam which has been tilted down, the disks being returned to their normal positions, a propelling force is imparted to the hub by the opposite disk. It will thus be observed that one or the other of the disks is exerting a propelling force as the walking-beam turns, but neither at the same time.

When it is desired to apply the brake, the operator by throwing the crank-shafts in the manner described will cause the force of the walking-beam to be exerted upon the crank-shaft having a coil therein and which has toggle-link connections with the brake-shoes. It will also be noted that by the provision of the propelling means shown and described, the apparatus is prevented from coming to a dead-center. It will be further noted that this device is out of gear at any and all times when not being propelled, allowing the entire propelling force to be instantly diverted into a brake force by the hub S' rolling on in turn with the trucks and gear of the car, while the disks, arms, hand-bars, and tread mechanism are standing still or are used in forcing the brake against the trucks. It will be further observed that in order to use this brake upon other styles of cars I only mount a suitable hand-operated lever, which will rise up from the inner rail of car, and which will do the work of the foot mechansm as used in this case, omitting shafts K and N, which throw brake in gear, in which case the hand-operated lever as mentioned to be added will rise up above the bridle in reach of the operator's hand, and will stand a few inches above the bridle and walking-beam.

I do not claim the presence of links H H as being new. I claim the way in which the ends connected with link G being hung downward, which does the spreading work as is in the old way, and gives the weight in this style of hanging them, thereby taking the shoes from the trucks as well as taking shaft F out of gear and holding same out of gear while brake is not in use; nor do I claim the shoes as new.

What I claim is—

1. A brake mechanism for hand-cars consisting, in combination with a truck, walking-beam and ratchet and gear mechanism for propelling the car, brake-shoes, toggle-link connections therewith, a crank-shaft having pivotal connection with said toggle-links, tread mechanism, connections between the same and said walking-beam, and means for throwing an arm of said crank-shaft so that it will be actuated by the tread mechanism to set the brakes, as set forth.

2. A brake mechanism for hand-cars consisting, in combination with a truck, walking-beam and ratchet and gear mechanism for propelling the car, brake-shoes, toggle-link connections therewith, a crank-shaft having pivotal connection with said toggle-links, tread mechanism, connections between the same and said walking-beam, and means for throwing an arm of said crank-shaft so that it will be actuated by the tread mechanism to set the brakes, and means for holding the brakes set, as set forth.

3. A brake mechanism for hand-cars consisting, in combination with a truck, walking-beam and ratchet and gear mechanism for propelling the car, brake-shoes, toggle-link connections therewith, a crank-shaft having pivotal connection with said toggle-links, tread mechanism, connections between the same and said walking-beam, means for throwing an arm of said crank-shaft so that it will be actuated by the tread mechanism to set the brakes, and a pivotal member mounted upon the truck and actuated by said crank-shaft and designed to release said shoes from truck, as set forth.

4. A brake mechanism for hand-cars consisting, in combination with a truck, walking-beam and ratchet and gear mechanism for propelling the car, brake-shoes, toggle-link connections therewith, a crank-shaft having pivotal connection with said toggle-links and having its shank portion formed into a resilient coil, tread mechanism, connections between the same and said walking-beam, and means of throwing an arm of said crank-shaft so that it will be actuated by the tread mechanism to set the brakes, as set forth.

5. A brake mechanism for hand-cars consisting, in combination with a truck, walking-beam and ratchet and gear mechanism for propelling the car, brake-shoes, toggle-link connections therewith, a crank-shaft having pivotal connection with said toggle-links, tread mechanism, connections between the same and said walking-beam, a second crank-shaft journaled in the walking-beam, and means actuated thereby for causing an arm of the crank-shaft connected to said toggle-links to be thrown into position to be actuated by said tread mechanism, as set forth.

6. A brake mechanism for hand-cars consisting, in combination with a truck, walking-beam and ratchet and gear connections therewith, a crank-shaft having pivotal connection with said toggle-links, a tread pivotally mounted upon the truck and having a projecting arm, a roller carried by said arm, pivotal link connections between said arm and the walking-beam, and mechanism for throwing an arm of said crank-shaft underneath said roller, whereby as the roller descends, it will cause said crank-shaft to rock and apply the brakes, as set forth.

In testimony whereof I hereunto affix my signature in the presence of two witnesses.

ANDREW J. ALLISON.

Witnesses:
W. T. BURNHAM,
O. R. LOBEN.